US011128750B1

(12) United States Patent
Lack

(10) Patent No.: US 11,128,750 B1
(45) Date of Patent: Sep. 21, 2021

(54) METHODS AND DEVICES FOR SECURE AUTHENTICATION TO A COMPUTE DEVICE

(71) Applicant: Invincea, Inc., Reston, VA (US)

(72) Inventor: Michael Nathan Lack, Arlington, VA (US)

(73) Assignee: Invincea, Inc., Reston, VA (US)

( * ) Notice: Subject to any disclaimer, the term of this patent is extended or adjusted under 35 U.S.C. 154(b) by 0 days.

(21) Appl. No.: 16/927,739

(22) Filed: Jul. 13, 2020

Related U.S. Application Data

(63) Continuation of application No. 16/420,916, filed on May 23, 2019, now Pat. No. 10,715,654, which is a
(Continued)

(51) Int. Cl.
*H04M 1/72463* (2021.01)
*H04W 12/06* (2021.01)
(Continued)

(52) U.S. Cl.
CPC ........ *H04M 1/72463* (2021.01); *G06F 21/31* (2013.01); *G06F 21/35* (2013.01);
(Continued)

(58) Field of Classification Search
CPC ............... G06F 21/32; G06F 21/6245; G06F 2221/2141; G06F 21/31; G06F 21/35; G06F 21/30; G06F 2221/2103; G06F 2221/2113; G06F 2221/2129; G06F 2221/2131; G06F 9/451; G06F 1/1626; G06F 1/3287; G06F 3/0488; G06F 11/3055; G06F 1/3206; G06F 1/3228; G06F 2201/865; G06F 2221/2149; G06F 21/34; H04W 12/06; H04W 12/08;
(Continued)

(56) References Cited

U.S. PATENT DOCUMENTS 6,615,191 B1 9/2003 Seeley
6,742,121 B1 5/2004 Safadi
(Continued)

OTHER PUBLICATIONS

US 9,230,088 B2, 01/2016, Dellinger et al. (withdrawn)
(Continued)

*Primary Examiner* — Daniel Lai
(74) *Attorney, Agent, or Firm* — Cooley LLP

(57) ABSTRACT

An apparatus includes a memory of a mobile compute device, and a hardware processor of the mobile compute device. The hardware processor is configured to implement an operating system and an authentication module. The operating system is configured to receive a first authentication identifier, and is also configured to authorize use of the mobile compute device based on the first authentication identifier meeting a first criterion. The authentication module is configured to, in response to the operating system authorizing use of the mobile compute device, disable at least one function of the mobile compute device and request a second authentication identifier. The authentication module is also configured to receive the second authentication identifier. The authentication module is also configured to enable the at least one function in response to the second authentication identifier meeting a second criterion.

25 Claims, 8 Drawing Sheets

US 11,128,750 B1
Page 2

Related U.S. Application Data continuation of application No. 15/632,808, filed on Jun. 26, 2017, now Pat. No. 10,306,052, which is a continuation of application No. 14/717,422, filed on May 20, 2015, now Pat. No. 9,692,879.

(60) Provisional application No. 62/000,835, filed on May 20, 2014.

(51) Int. Cl.
*H04B 5/00* (2006.01)
*H04W 4/80* (2018.01)
*G06F 21/35* (2013.01)
*H04M 1/67* (2006.01)
*H04L 29/06* (2006.01)
*G06F 21/31* (2013.01)
*H04L 9/32* (2006.01)
*H04W 12/04* (2021.01)
*G06F 21/34* (2013.01)

(52) U.S. Cl.
CPC .......... *H04B 5/0031* (2013.01); *H04L 63/08* (2013.01); *H04M 1/67* (2013.01); *H04W 4/80* (2018.02); *H04W 12/06* (2013.01); *G06F 21/34* (2013.01); *G06F 2221/2149* (2013.01); *H04L 9/3247* (2013.01); *H04W 12/04* (2013.01)

(58) Field of Classification Search
CPC ..... H04W 12/02; H04W 12/04; H04W 4/008; H04W 24/02; H04W 4/02; H04W 4/029; H04W 12/00407; H04W 12/0609; H04W 12/0804; H04W 12/0806; H04W 4/023; H04W 4/027; H04W 4/08; H04W 4/20; H04W 4/80; H04M 1/72577; H04M 1/72463; H04M 1/67; H04B 5/0031; H04L 9/3247; H04L 63/08
See application file for complete search history.

(56) References Cited

U.S. PATENT DOCUMENTS

| | | |
|---|---|---|
| 7,231,199 B2 | 6/2007 | Adams et al. |
| 7,665,146 B2 | 2/2010 | Munje et al. |
| 7,706,837 B2 | 4/2010 | Ladouceur |
| 7,784,088 B2 | 8/2010 | Darbha et al. |
| 7,823,214 B2 | 10/2010 | Rubinstein et al. |
| 7,912,455 B2 | 3/2011 | Adams et al. |
| 7,929,960 B2 | 4/2011 | Martin et al. |
| 8,046,721 B2 | 10/2011 | Chaudhri et al. |
| 8,117,651 B2 | 2/2012 | Novotney et al. |
| 8,136,053 B1 | 3/2012 | Miller et al. |
| 8,185,097 B2 | 5/2012 | Vanderlinden et al. |
| 8,190,913 B2 | 5/2012 | Adams et al. |
| 8,209,637 B2 | 6/2012 | Chaudhri et al. |
| 8,249,556 B2 | 8/2012 | Olsen et al. |
| 8,249,558 B2 | 8/2012 | Olsen et al. |
| 8,250,371 B2 | 8/2012 | Darbha et al. |
| 8,285,949 B2 | 10/2012 | De Atley et al. |
| 8,321,922 B1 | 11/2012 | Lo et al. |
| 8,407,768 B1 | 3/2013 | Hayter |
| 8,407,773 B1 | 3/2013 | Hayter et al. |
| 8,484,728 B2 | 7/2013 | De Atley et al. |
| 8,489,890 B2 | 7/2013 | Darbha et al. |
| 8,504,842 B1 | 8/2013 | Meacham |
| 8,555,363 B2 | 10/2013 | Lo et al. |
| 8,560,004 B1 | 10/2013 | Tsvetkov et al. |
| 8,590,036 B2 | 11/2013 | Novotney et al. |
| 8,638,385 B2 | 1/2014 | Bhogal |
| 8,638,939 B1 | 1/2014 | Casey et al. |
| 8,763,079 B2 | 6/2014 | Rubinstein et al. |
| 8,782,775 B2 | 7/2014 | Fadell et al. |
| 8,788,838 B1 | 7/2014 | Fadell et al. |
| 8,810,367 B2 | 8/2014 | Mullins |
| 8,873,147 B1 | 10/2014 | Rhodes et al. |
| 8,874,624 B2 | 10/2014 | Serlet et al. |
| 8,875,268 B2 | 10/2014 | Swerdlow et al. |
| 8,880,736 B2 | 11/2014 | Cooper et al. |
| 8,881,263 B2 | 11/2014 | Hewinson |
| 8,881,310 B2 | 11/2014 | Hajj et al. |
| 8,903,141 B2 | 12/2014 | Heilpern |
| 8,925,069 B2 | 12/2014 | Louboutin et al. |
| 8,943,580 B2 | 1/2015 | Fadell et al. |
| 8,954,736 B2 | 2/2015 | Miller et al. |
| 8,973,104 B2 | 3/2015 | Rokek et al. |
| 8,994,499 B2 | 3/2015 | Zhao et al. |
| 9,030,293 B1 | 5/2015 | Tabak et al. |
| 9,038,167 B2 | 5/2015 | Fadell et al. |
| 9,043,887 B2 | 5/2015 | McLachlan et al. |
| 9,070,149 B2 | 6/2015 | Lin et al. |
| 9,113,333 B2 | 8/2015 | Lo et al. |
| 9,118,666 B2 | 8/2015 | Naguib |
| 9,134,896 B2 | 9/2015 | Fadell et al. |
| 9,152,309 B1 | 10/2015 | Arréhn et al. |
| 9,160,541 B2 | 10/2015 | Novotney et al. |
| 9,195,388 B2 | 11/2015 | Shepherd et al. |
| 9,213,822 B2 | 12/2015 | Dellinger et al. |
| 9,223,937 B2 | 12/2015 | Flowers et al. |
| 9,225,753 B1 | 12/2015 | Maxwell |
| 9,239,912 B1 | 1/2016 | Dorwin et al. |
| 9,245,100 B2 | 1/2016 | Marco et al. |
| 9,250,795 B2 | 2/2016 | Fadell et al. |
| 9,262,612 B2 | 2/2016 | Cheyer |
| 9,264,421 B2 | 2/2016 | Dermu |
| 9,298,361 B2 | 3/2016 | Shepherd et al. |
| 9,363,251 B2 | 6/2016 | Morikuni et al. |
| 9,372,978 B2 | 6/2016 | Dellinger et al. |
| 9,519,771 B2 | 12/2016 | Fadell et al. |
| 9,542,783 B2 | 1/2017 | Slaby et al. |
| 9,590,352 B2 | 3/2017 | Bilbrey et al. |
| 9,633,247 B2 | 4/2017 | Pope et al. |
| 9,672,350 B2 | 6/2017 | De Atley et al. |
| 9,692,879 B1 | 6/2017 | Lack et al. |
| 9,706,032 B2 | 7/2017 | Pai et al. |
| 9,721,107 B2 | 8/2017 | Han et al. |
| 9,729,380 B1 | 8/2017 | Chung |
| 9,778,837 B2 | 10/2017 | Shepherd et al. |
| 9,785,759 B1 | 10/2017 | Dorwin et al. |
| 10,306,052 B1 | 5/2019 | Lack et al. |
| 10,715,654 B1 | 7/2020 | Lack et al. |
| 2006/0026689 A1 | 2/2006 | Barker et al. |
| 2006/0123056 A1 | 6/2006 | Darbha et al. |
| 2006/0156415 A1 | 7/2006 | Rubinstein et al. |
| 2007/0016804 A1 | 1/2007 | Kemshall |
| 2007/0050632 A1 | 3/2007 | Matsuoka et al. |
| 2007/0083467 A1 | 4/2007 | Lindahl et al. |
| 2007/0234420 A1 | 10/2007 | Novotney et al. |
| 2007/0257104 A1 | 11/2007 | Owen et al. |
| 2007/0260655 A1 | 11/2007 | Adams et al. |
| 2007/0300063 A1 | 12/2007 | Adams et al. |
| 2008/0058006 A1 | 3/2008 | Ladouceur |
| 2008/0077986 A1 | 3/2008 | Rivera et al. |
| 2008/0172750 A1 | 7/2008 | Keithley et al. |
| 2008/0229389 A1 | 9/2008 | Singh et al. |
| 2008/0318550 A1 | 12/2008 | DeAtley |
| 2009/0061907 A1 | 3/2009 | Richardson et al. |
| 2009/0083834 A1 | 3/2009 | Rubinstein et al. |
| 2009/0083847 A1 | 3/2009 | Fadell et al. |
| 2009/0083850 A1 | 3/2009 | Fadell et al. |
| 2009/0096573 A1 | 4/2009 | Graessley |
| 2009/0165125 A1 | 6/2009 | Brown et al. |
| 2009/0187676 A1 | 7/2009 | Griffin et al. |
| 2009/0205041 A1 | 8/2009 | Michalske |
| 2009/0249064 A1 | 10/2009 | De Atley et al. |
| 2009/0249065 A1 | 10/2009 | De Atley et al. |
| 2009/0249075 A1 | 10/2009 | De Atley et al. |
| 2009/0254753 A1 | 10/2009 | De Atley et al. |
| 2010/0037323 A1 | 2/2010 | Lemieux et al. |
| 2010/0293606 A1 | 11/2010 | Darbha et al. |
| 2010/0312966 A1 | 12/2010 | De Atley et al. |
| 2010/0313196 A1 | 12/2010 | De Atley et al. |

(56) References Cited

U.S. PATENT DOCUMENTS

| | | |
|---|---|---|
| 2010/0322485 A1 | 12/2010 | Riddiford |
| 2011/0010699 A1 | 1/2011 | Cooper et al. |
| 2011/0010701 A1 | 1/2011 | Cooper et al. |
| 2011/0061113 A1 | 3/2011 | Rubinstein et al. |
| 2011/0154041 A1 | 6/2011 | Godfrey et al. |
| 2011/0154434 A1* | 6/2011 | Hernacki ............... G06F 21/31 726/1 |
| 2011/0283241 A1 | 11/2011 | Miller et al. |
| 2011/0313922 A1 | 12/2011 | Ben Ayed |
| 2012/0015629 A1 | 1/2012 | Olsen et al. |
| 2012/0021724 A1 | 1/2012 | Olsen et al. |
| 2012/0060128 A1 | 3/2012 | Miller et al. |
| 2012/0079582 A1 | 3/2012 | Brown et al. |
| 2012/0079609 A1 | 3/2012 | Bender et al. |
| 2012/0137351 A1 | 5/2012 | Kiester et al. |
| 2012/0167199 A1 | 6/2012 | Riddiford |
| 2012/0207296 A1 | 8/2012 | George et al. |
| 2012/0208511 A1 | 8/2012 | Vanderlinden et al. |
| 2012/0233459 A1 | 9/2012 | Adams et al. |
| 2012/0235790 A1 | 9/2012 | Zhao et al. |
| 2012/0238206 A1 | 9/2012 | Singh et al. |
| 2012/0245941 A1 | 9/2012 | Cheyer |
| 2012/0260095 A1 | 10/2012 | Von Hauck et al. |
| 2012/0278614 A1 | 11/2012 | Choi |
| 2012/0307126 A1 | 12/2012 | Bhogal |
| 2012/0311499 A1 | 12/2012 | Dellinger et al. |
| 2012/0317618 A1 | 12/2012 | Darbha et al. |
| 2013/0014247 A1 | 1/2013 | Novotney et al. |
| 2013/0036461 A1 | 2/2013 | Lowry |
| 2013/0052947 A1 | 2/2013 | Kole et al. |
| 2013/0054732 A1 | 2/2013 | Serlet et al. |
| 2013/0061314 A1 | 3/2013 | De Atley et al. |
| 2013/0074170 A1 | 3/2013 | Lo et al. |
| 2013/0088192 A1 | 4/2013 | Eaton |
| 2013/0097672 A1 | 4/2013 | Pathiyal |
| 2013/0104187 A1 | 4/2013 | Weidner |
| 2013/0104196 A1 | 4/2013 | Singh et al. |
| 2013/0104203 A1 | 4/2013 | Davis |
| 2013/0187753 A1 | 7/2013 | Chiriyankandath |
| 2013/0191910 A1 | 7/2013 | Dellinger et al. |
| 2013/0191911 A1 | 7/2013 | Dellinger et al. |
| 2013/0194067 A1 | 8/2013 | Kimbrell |
| 2013/0219454 A1 | 8/2013 | Hewinson |
| 2013/0260717 A1* | 10/2013 | Miyaki ............... H04W 12/08 455/411 |
| 2013/0294660 A1 | 11/2013 | Heilpern |
| 2013/0303085 A1 | 11/2013 | Boucher et al. |
| 2013/0331027 A1 | 12/2013 | Rose et al. |
| 2013/0345981 A1 | 12/2013 | van Os et al. |
| 2014/0024330 A1 | 1/2014 | Chu et al. |
| 2014/0026202 A1 | 1/2014 | Lo et al. |
| 2014/0047523 A1 | 2/2014 | Swerdlow et al. |
| 2014/0068456 A1 | 3/2014 | Chan et al. |
| 2014/0075528 A1 | 3/2014 | Matsuoka |
| 2014/0101768 A1 | 4/2014 | Miller et al. |
| 2014/0109197 A1 | 4/2014 | Schneider et al. |
| 2014/0112555 A1 | 4/2014 | Fadell et al. |
| 2014/0115694 A1 | 4/2014 | Fadell et al. |
| 2014/0115695 A1 | 4/2014 | Fadell et al. |
| 2014/0115696 A1 | 4/2014 | Fadell et al. |
| 2014/0137191 A1 | 5/2014 | Goldsmith et al. |
| 2014/0155028 A1 | 6/2014 | Daniela et al. |
| 2014/0187207 A1 | 7/2014 | Slack et al. |
| 2014/0189801 A1 | 7/2014 | Rokek et al. |
| 2014/0189829 A1 | 7/2014 | McLachlan et al. |
| 2014/0196142 A1 | 7/2014 | Louboutin et al. |
| 2014/0201120 A1 | 7/2014 | Lydon et al. |
| 2014/0201531 A1 | 7/2014 | Toy et al. |
| 2014/0201532 A1 | 7/2014 | Toy et al. |
| 2014/0215086 A1 | 7/2014 | Pitschel et al. |
| 2014/0223184 A1 | 8/2014 | Novotney et al. |
| 2014/0223322 A1 | 8/2014 | Slack et al. |
| 2014/0230049 A1 | 8/2014 | Fadell et al. |
| 2014/0263648 A1 | 9/2014 | Van Bosch et al. |
| 2014/0283012 A1 | 9/2014 | Eggerton et al. |
| 2014/0283013 A1 | 9/2014 | Marco et al. |
| 2014/0304706 A1* | 10/2014 | Zhang .................. G06F 9/445 718/100 |
| 2014/0310350 A1 | 10/2014 | Borggaard et al. |
| 2014/0354401 A1 | 12/2014 | Soni et al. |
| 2014/0359750 A1 | 12/2014 | Adams et al. |
| 2014/0361872 A1 | 12/2014 | Garcia et al. |
| 2014/0364085 A1 | 12/2014 | Garcia |
| 2014/0364099 A1 | 12/2014 | Pai et al. |
| 2014/0378063 A1 | 12/2014 | Nathwani et al. |
| 2015/0058942 A1 | 2/2015 | Dermu |
| 2015/0081837 A1 | 3/2015 | Bernier et al. |
| 2015/0082421 A1 | 3/2015 | Flowers et al. |
| 2015/0094023 A1 | 4/2015 | Abramson et al. |
| 2015/0096001 A1 | 4/2015 | Morikuni et al. |
| 2015/0113271 A1 | 4/2015 | Jooste et al. |
| 2015/0137938 A1 | 5/2015 | Slaby et al. |
| 2015/0200934 A1 | 7/2015 | Naguib |
| 2015/0207820 A1 | 7/2015 | Klug et al. |
| 2015/0213443 A1 | 7/2015 | Geffon et al. |
| 2016/0188854 A1 | 6/2016 | Kim |

OTHER PUBLICATIONS

"User Inactivity in android?" from Stack Overflow (retrieved from https://stackoverflow.com/questions/15610403/user-inactivity-in-android), dated Mar. 25, 2013 (Year: 2013).*

"How to identify the mobile is idle?" by Stack Overflow (retrieved from https://stackoverflow.com/questions/22274776/how-to-identify-the-mobile-is-idle), dated Mar. 2014 (Year: 2014).*

[Author Unknown] Stack Overflow, "Activity handle when screen unlocked", dated Mar. 17, 2012 (Year: 2012), 2 pages.

Dyer, K., "IBM launches two-factor authentication for NFC devices," NFC World, Oct. 21, 2013, 3 pages.

Office Action for U.S. Appl. No. 14/717,422, dated Aug. 23, 2016, 14 pages.

Office Action for U.S. Appl. No. 15/632,808, dated Aug. 3, 2017, 9 pages.

Office Action for U.S. Appl. No. 15/632,808, dated Mar. 29, 2018, 19 pages.

Office Action for U.S. Appl. No. 15/632,808, dated Sep. 18, 2018, 18 pages.

Notice of Allowance for U.S. Appl. No. 15/632,808, dated Jan. 8, 2019, 9 pages.

Office Action for U.S. Appl. No. 16/420,916, dated Oct. 4, 2019, 20 pages.

Notice of Allowance for U.S. Appl. No. 16/420,916, dated Mar. 10, 2020, 10 pages.

Notice of Allowance (Corrected) for U.S. Appl. No. 16/420,916, dated Apr. 24, 2020, 7 pages.

"Operating system—OS" by Beal, retrieved from https://www.webopedia.com/TERM/O/operating_system.html.

No Lock—Android Apps on Google Play, Aug. 23, 2013, BoD, Retrieved from the Internet on Oct. 6, 2017: <https://web.archive.org/web/20130823055956/https://play.google.com/store/apps/details?id=org.jraf.android.nolock&hl=en>, 2 pages.

Screen Lock—Android Apps on Google Play, Apr. 28, 2014, Prahallad, Retrieved from the Internet on Oct. 6, 2017: <https://web.archive.org/web/20140428064635/https://play.google.com/store/apps/details?id=com.iglint.android.screenlock>, 4 pages.

Screen Off and Lock—Android Apps on Google Play, Feb. 10, 2014, Katecca, Retrieved from the Internet on Oct. 6, 2017: <https://web.archive.org/web/20140210063448/https://play.google.com/store/apps/details?id=com.katecca.screenofflock>, 2 pages.

WidgetLocker—Android Lockscreen Replacement, Jan. 3, 2014, Retrieved from the Internet on Oct. 6, 2017: <https://web.archive.org/web/20140103090558/http://teslacoilsw.com/widgetlocker/>, 11 pages.

App Lock (Smart App Protector)—Android Apps on Google Play, Apr. 4, 2014, SpSoft, Retrieved from the Internet on Oct. 6, 2017: <https://web.archive.org/web/20140404003019/https://play.google.com/store/apps/details?id=com.sp.protector.free>, 4 pages.

AppLock—Android Apps on Google Play, Apr. 13, 2014, DoMobile Lab, Retrieved from the Internet on Oct. 6, 2017: <https://web.

(56) References Cited

OTHER PUBLICATIONS archive.org/web/20140413014312/https://play.google.com/store/apps/details?id=com.domobile.applock>, 4 pages.
CM Security—FREE Antivirus—Android Apps on Google Play, Feb. 22, 2014, KS Mobile Inc., Retrieved from the Internet on Oct. 6, 2017: <https://web.archive.org/web/20140222012137/https://play.google.com/store/apps/details?id=com.cleanmaster.security>, 4 pages.
Fingerprint Locking—Android Apps on Google Play, Feb. 10, 2014, Softwego, Retrieved from the Internet on Oct. 6, 2017: <https://web.archive.org/web/20140210051013/https://play.google.com/store/apps/details?id=com.softwego.lockscreen>, 2 pages.
Fingerprint/Keypad Lock Screen—Android Apps on Google Play, Feb. 22, 2014, Softwego, Retrieved from the Internet on Oct. 6, 2017: <https://web.archive.org/web/20140222013504/https://play.google.com/store/apps/details?id=com.softwego.lockscreen>, 3 pages.
Khan, Sameed, "Visidon AppLock for Android Uses Face Recognition to Unlock Protected Apps", https://web.archive.org/web/20140313125245/https://www.addictivetips.com/mobile/visidon-applock-for-android-uses-face-recognition-to-unlock-protected-apps/>, Jul. 20, 2011 (Year: 2011), 4 pages.
Mac App Store—Lock Screen Plus, Nov. 3, 2013, Retrieved from the Internet: Oct. 6, 2017: <https://web.archive.org/web/20131103032944/https://itunes.apple.com/us/app/lock-screen-plus/id523667569?mt=12>, 3 pages.

\* cited by examiner

METHODS AND DEVICES FOR SECURE AUTHENTICATION TO A COMPUTE DEVICE

CROSS-REFERENCE TO RELATED APPLICATIONS

This application is a continuation of U.S. patent application Ser. No. 16/420,916, entitled "Methods and Devices for Secure Authentication to a Compute Device", filed May 23, 2019, now U.S. Pat. No. 10,715,654, which is a continuation application of U.S. application Ser. No. 15/632,808, entitled "Methods and Devices for Secure Authentication to a Compute Device", filed Jun. 26, 2017, now U.S. Pat. No. 10,306,052, which is a continuation application of U.S. application Ser. No. 14/717,422, entitled "Methods and Devices for Secure Authentication to a Compute Device", filed May 20, 2015, now U.S. Pat. No. 9,692,879, which claims priority to U.S. Provisional Application No. 62/000,835 entitled "Methods and Devices for Authentication", filed May 20, 2014, the entire disclosure of each of which is incorporated herein by reference.

GOVERNMENT LICENSE RIGHTS

This invention was made with government support under contract no. H98230-13-C-1435 awarded by the United States Government. The government has certain rights in the invention.

BACKGROUND

Some embodiments described herein relate generally to secure and/or multi-factor authentication for a compute device.

Devices such as smart phones, tablets, and the like are increasingly used for sensitive operations and/or business purposes. The mobility of these devices introduces risks of the use of these devices, and/or the information stored thereon, for malicious purposes. It is now commonplace for these devices to include built in security features that are directed to user authentication, such as lock screens. Such security features are either too simple (e.g., a four-digit pin), or too cumbersome (e.g., a lengthy password having a necessary mix of alphabets, numbers, etc.) for entry on the relatively small input screen associated with such devices.

Accordingly, a need exists for secure authentication that provides adequate security without significant modification of the operating components of the device.

SUMMARY

An apparatus includes a memory of a mobile compute device, and a hardware processor of the mobile compute device. The hardware processor is configured to implement an operating system and an authentication module. The operating system is configured to receive a first authentication identifier, and is also configured to authorize use of the mobile compute device based on the first authentication identifier meeting a first criterion. The authentication module is configured to, in response to the operating system authorizing use of the mobile compute device, disable at least one function of the mobile compute device and request a second authentication identifier. The authentication module is also configured to receive the second authentication identifier. The authentication module is also configured to enable the at least one function in response to the second authentication identifier meeting a second criterion.

DESCRIPTION

As used herein, the singular forms "a," "an" and "the" include plural referents unless the context clearly dictates otherwise. Thus, for example, the term "a communication module" is intended to mean a single module or a combination of modules.

In some embodiments, an apparatus includes an authentication module implemented as a native application in at least one of a memory or a processor of a mobile device. The apparatus also includes the authentication module configured to, at a first time, disable at least one function of the mobile device and request an authentication identifier from a Near Field Communication (NFC) device associated with the mobile device. The authentication module is also configured to receive, from the NFC device via an NFC communication channel and at a second time after the first time, the authentication identifier. The authentication module is also configured to compare the authentication identifier with a predetermined criterion. The authentication module is also configured to enable the at least one function of the mobile device when the authentication identifier meets the predetermined criterion.

In some embodiments, a non-transitory processor-readable medium stores code representing instructions to be executed by a processor. The code includes code to cause the processor to send a signal to display a primary lock screen on a mobile device. The primary lock screen is integrated with an operating system of the mobile device, and the primary lock screen requests a first authentication identifier from a user. The code also includes code to cause the processor to receive an indication of the first authentication identifier, and compare the first authentication identifier to a first criterion associated with the operating system. The code also includes code to cause the processor to send, in response to the indication of the first authentication identifier meeting the first criterion, a signal to remove the primary lock screen. The code also includes code to cause the processor to send, in response to removing the primary lock screen, a signal to display a secondary lock screen. The secondary lock screen is associated with an application not integrated with the operating system of the mobile device. The secondary lock screen requests a second authentication identifier from the user. The code also includes code to cause the processor to receive an indication of the second authentication identifier, and compare the second authentication identifier to a second criterion associated with the native application. The code also includes code to cause the processor to send, based on the indication of the second authentication identifier meeting the second criterion, a signal to remove the secondary lock screen and provide the user access to functionality of the mobile device.

Figure 1:
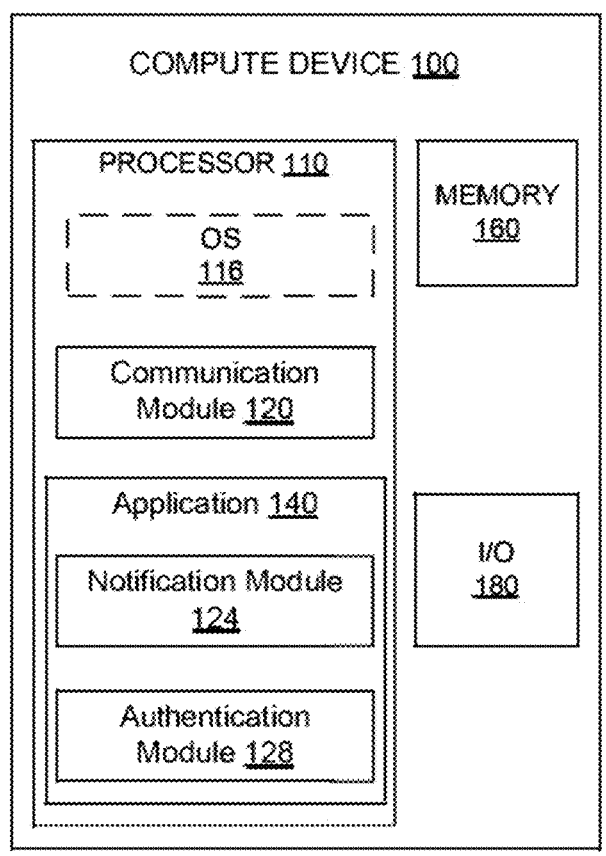
FIG. 1 is a schematic diagram that illustrates a compute device configured to provide multi-factor authentication, according to an embodiment.

FIG. 1 is a schematic diagram of a compute device 100 configured to provide multi-factor authentication to a user of the compute device. The compute device 100 can be any device with certain data processing and/or computing capabilities such as, for example, a server, a workstation, a tablet, a mobile compute device, and/or the like. As shown in FIG. 1, the compute device 100 includes a hardware processor 110, a memory 160, input/output (I/O) interfaces 180, and/or other component(s). In some embodiments, the I/O interfaces 180 can include user interfaces (e.g., a keypad, a mouse, a touchscreen, a speaker, microphone, and/or the like) and/or communication interfaces (e.g., transceivers for various wired and wireless protocols).

The memory 160 can be, for example, a Random-Access Memory (RAM) (e.g., a dynamic RAM, a static RAM), a flash memory, a removable memory, and/or so forth. In some embodiments, instructions associated with performing the operations described herein (e.g., user authentication) can be stored within the memory 160 and executed at the processor 110.

The hardware processor 110 can be any element configured to execute program code, such as a general purpose processor, a field-programmable gate array (FPGA), an application-Specific Integrated Circuit (ASIC), a Programmable Logic Device (PLD), a Digital Signal Processor (DSP), and/or the like, and combinations thereof. The processor 110 includes a communication module 120, a notification module 124, an authentication module 128, and/or other module(s) (not shown). For example, the processor can include a control module (not shown) for configuring operational parameters of the other modules. In some embodiments, the processor can include one or more modules (collectively, the reference character 116) based on executing instructions that manage hardware resources of the compute device 100, and that provide consumable services, such as application programming interface (API) calls, for software and/or hardware modules of the compute device and/or otherwise interacting with the compute device.

In some embodiments, the processor 110 can also execute instructions to run an operating system (OS) 116. The OS 116 can include, but not be limited to, a real-time OS, a multi-user OS, a multi-tasking OS, a distributed OS, a templated OS, an embedded OS, and/or the like. In some embodiments, the OS is any suitable OS for operating a mobile device, such as, for example, a mobile OS. The term "operating system" and "OS" as used herein indicate any module(s) executed by the processor and configurable to interact with the notification module 124 and the authentication module 128 as described herein.

Each module in the processor 110 can be any combination of hardware-based module (e.g., a field-programmable gate array (FPGA), an application specific integrated circuit (ASIC), a digital signal processor (DSP)), hardware-based module executing software (e.g., a module of computer code stored in the memory 160 and/or executed at the processor 110), and/or a combination of hardware- and software-based modules. Each module in the processor 110 is capable of performing one or more specific functions/operations as described in further detail with respect to FIG. 1. In some embodiments, each module included and executed in the processor 110 can be, for example, a process, an application, a virtual machine, and/or some other hardware and/or software module (stored in memory and/or executing in hardware). The processor 110 can be any suitable processor configured to run and/or execute those modules.

In some embodiments, the processor 110 can include more or less modules than those shown in FIG. 1. In some embodiments, the compute device 100 can include more components than those shown in FIG. 1. In some embodiments, the compute device 100 can include or be coupled to an output (e.g., a printer, a monitor, a speaker, a display device such as a touch screen, etc.), such that an output of the compute device (e.g., an authentication interface) can be presented to a user via the output. In some embodiments, one or more modules can collectively provide a service, and conversely, each module can include one or more services. In some embodiments, for example, the notification module 124, and an authentication module 128 can collectively provide a second authentication service as will be discussed in greater detail below. As another example, OS 116 can include several services for managing the resources of the compute device 100.

In some embodiments, the compute device is operatively coupled to a network (not shown). The network can be any type of network that can operatively connect and enable data transmission between the compute device 100 and other entities in the network. The network can be, for example, a wired network (an Ethernet, a local area network (LAN), etc.), a wireless network (e.g., a wireless local area network (WLAN), a wireless-fidelity (Wi-Fi™) network, cellular network, etc.), or a combination of wired and wireless networks (e.g., the Internet, etc.). In some embodiments, the network can be multiple networks connected together to form a larger network (e.g., the Internet).

In some embodiments, the notification module 124 can be configured to interact with the OS 116 to receive one or more notifications of actions and/or occurrences detected by the OS. In some embodiments, the notification module 124 can register with the OS to receive the notification. In other embodiments, the notification module 124 can periodically check for notification. In other embodiments, the notification module 124 monitors for notifications that are broadcasted by the OS 116.

In some embodiments, a notification can be related to user interaction with the compute device 100. In some embodiments, a notification can be related to an interaction of the user with the compute device 100 such as, for example, after the compute device 100 is powered up, or upon passage of a prespecified amount of time (e.g., an hour) after the user has powered up the compute device, or when the user interacts with the compute device after a period of inactivity, and/or the like. In some embodiments, the interaction can include one or more authentication steps (also referred to as a first authentication) provided by the OS 116. In some embodiments, the OS 116 is configured to receive a first authentication identifier. In such embodiments, the operating system can be configured to authorize use of the mobile compute device based on the first authentication identifier meeting a first predetermined criterion. In some embodiments, the first authentication identifier is associated with an operating system-based authentication mode. For example, the first authentication identifier (also referred to simply as first authentication, or as first authentication information) can be a password or Personal Identification Number (PIN) entry by a user on a keyguard to unlock the compute device 100. The term "keyguard" as used herein refers to a user interface that disables ("locks") usage of the compute device 100 to prevent interaction with a user, such that a special key combination received from the user, unlikely to be entered accidentally, can be used to unlock the device. In some embodiments, the notification can indicate that the user has cleared the first authentication, and is now able to interact with the compute device 100. A non-limiting example of such a notification is the ACTION_USER_PRESENT action broadcast by Android™ operating systems after the keyguard is removed due to successful authentication (i.e., meets the first criterion). Another non-limiting example of such a notification is the BOOT_COMPLETED action broadcast by Android™ operating systems after a successful startup operation.

In some embodiments, the authentication module 128 is configured to receive the notification from the notification module 124, and is further configured to substantially immediately disable usage of aspects of the compute device 100, pending additional authentication (also referred to as a second authentication, as second authentication information, or as a second authentication identifier). In some embodiments, the second authentication identifier is associated with any suitable non-operating system-based authentication mode. The term "substantially immediately" as used herein generally indicates the capability of compute devices, and of the compute device 100 in particular, operating at speeds far in excess of average human response times, to disable usage of the compute device 100 after the first authentication and prior to any subsequent human interaction. Disabling usage of the compute device 100 can include disabling one or more of the I/O interfaces 180. For example, a touchscreen (not shown) of the compute device 100 can be disabled, while still permitting the user to still effect volume control via volume control buttons (not shown). Further, disabling usage of one or more I/O interfaces 180 can include disabling interacting with some aspects of the compute device 100, while still permitting others. For example, a touchscreen of the compute device 100 may permit the user to manipulate a music player service, but otherwise forbid interaction. As another example, disabling usage of the compute device 100 can include disabling access to the functionality of one or more other modules (not shown) of the compute device 100.

In some embodiments, disabling one or more of the I/O interfaces 180 as described herein includes specifying, to the OS 116, the I/O interfaces 180 to be disabled, and the manner of disabling the I/O interfaces 180. In this manner, aspects of the modules disclosed herein can interact with the OS 116 in a manner similar to any other modules implemented by the processor 110 that do not form part of the OS. As an example, the specification provided to the OS 116 can include an opaque view to be presented on a touchscreen interface of the compute device 100, where the opaque view cannot be removed without second authentication, and may or may not consume touch events received at the touchscreen.

The second authentication can necessitate any suitable form of input from the user via the I/O interfaces 180 to permit usage of the compute device 100. In some embodiments, the second authentication includes receiving a unique identifier (e.g., a PIN number, a password, a unique swipe pattern, etc.) via a touchscreen or via a keypad of the compute device 100. In some embodiments, the second authentication includes receiving biometric information via a biometric scanning interface of the compute device 100. In some embodiments, the second authentication includes receiving audio and/or visual information via (for example) a microphone and/or a camera of the compute device 100. An example of visual information can be the image of a unique code such as a barcode, a quick response (QR) code, and/or the like. In some embodiments, the second authentication can include a hardware component such as, for example, an NFC card/device, a keychain dongle, and/or the like. In some embodiments, the second authentication implements Federal Information Processing Standards (FIPS) 196. In some embodiments, the second authentication can request a second authentication identifier (e.g., in response to a request from the authentication module 128) from a user-specific NFC device associated with the compute device 100. The second authentication identifier can be received from the NFC device via an NFC communication channel.

In some embodiments, the first authentication information/identifier is provided via a first input mode, such as via a first I/O interface from the I/O interfaces 180, and the second authentication information/identifier is provided via a second input mode, such as via a second I/O interface from the I/O interfaces 180. In some embodiments, the first input mode and the second input mode can be the same (e.g., both entered via a keyboard), while in other embodiments, the first input mode and the second input mode can be different. For example, the first input mode can be a biometric input such as a fingerprint, and the second input mode can be a touch-screen input, such as via an on-screen keyboard or via a swipe pattern.

In some embodiments, interaction of the notification module 124 and the authentication module 128 with the OS 116 can be substantially similar to other modules/processes running outside the context of the OS itself. Said another way, such interaction may be akin to a "system call" and/or an "interprocess communication" (IPC). In this manner, second authentication is available without modifying the OS 116. In some embodiments, the notification module 124 and the authentication module 128 encompass an application 140 running on the compute device 100 and can include a native application that is not part of or included in the OS 116. Applications that are not part of the OS 116 can be installed on the compute device already running the OS. In some embodiments, the native application 140 is not part of the OS 116 (e.g., not integrated with the OS and/or the OS kernel) but can be executed and/or triggered by the OS (e.g., can be installed and run by the OS). The Applications interact with the compute device via the OS and do not modify the underlying functionality of the OS. For example, application 140 can access functions of the OS 116 via public application programming interface (API) calls, public dynamic link library (DLL) calls and/or the like, but may be unable to access or modify private internal functions or capabilities of the OS 116. Application 140 can also register to receive public events or notifications from the OS 116, but may be unable to receive private signals related to the internal function of the OS 116. Application 140 can include, for example, applications acquired through an online store or marketplace such as Android Applications available on stores including Google Play™, the iTunes® store by Apple, Inc., the Apps for Android™ store provided by Amazon®, and/or the like. Examples of the OS 116 executed on the compute device 100 can be, but are not limited to, operating systems such as Android™, Blackberry® OS, the iOS™, Windows Phone™, Firefox™ OS, Palm™ OS, and/or the like.

In other embodiments, either a first authentication process and/or a second authentication process can be at least partially performed by an authentication server (not shown in FIG. 1) rather than the compute device 100. For example, the authentication module 128 can be configured to communicate with another device via the network, such as, for example, an authentication server (not shown), to carry out second authentication. In such embodiments, the authentication module 128 can transmit the received second authentication information (also referred to as a "second authentication identifier") to the authentication server, and receive an indication of verification of the second authentication information from the authentication server. In some embodiments, communication between the authentication module 128 and the authentication server is encrypted. For example, the authentication module 128 receives a public key of a public key-private key pair from the authentication server, and employs the public key to decrypt communication, such as verification of the second authentication information, from the authentication server, and/or encrypt communication, such as the received second authentication information, sent to the authentication server.

Figure 2:
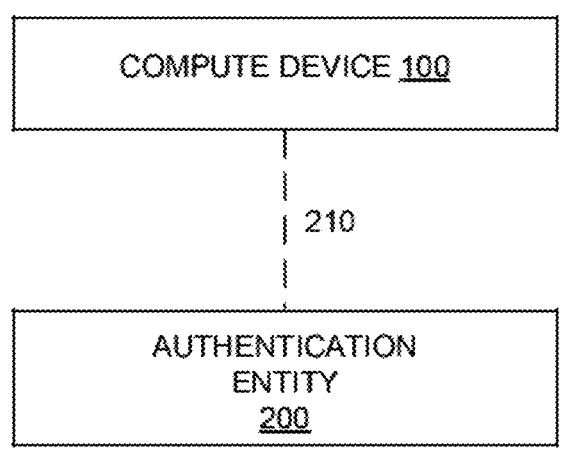
FIG. 2 is a schematic diagram that illustrates the compute device of FIG. 1 in communication with an authentication entity, according to an embodiment.

In some embodiments, and as illustrated in FIG. 2, the second authentication includes receiving input from an authenticating entity 200 external to the compute device 100. The connection 210 between the compute device 100 and the authenticating entity 200, indicated by a dashed line, can be any suitable connection for at least transmitting authenticating information from the authenticating entity 200 to the compute device 100. The connection 210 can include one or more of a wired connection, a wireless-fidelity (Wi-Fi™) connection, a wireless (Bluetooth®) connection, an NFC connection, a radio-frequency identification (RFID) connection, a global positioning system (GPS)-based connection, and/or the like. In some embodiments, the connection is encrypted and/or otherwise secured. In some embodiments, the authenticating entity 200 can encompass a hardware component such as, for example, an NFC card, a keychain dongle, and/or the like.

In some embodiments, the authentication module 128 is configured to initiate the authentication request from the authenticating entity 200, such as (for example) by broadcasting a request for authentication information, by sending a targeted/unicast request to the authenticating entity, and/or the like. In other embodiments, the authenticating entity 200 broadcasts the authentication information, and the broadcasted authentication information is uniquely usable by the authentication module 128 to carry out the second authentication. In some embodiments, the authenticating entity 200 sends the authentication information to the compute device 100 in a targeted manner. In some embodiments, both the authentication module 128 and the authenticating entity 200 are configurable and/or otherwise programmable to be otherwise associated with the same authentication information. For example, the authentication information can include a key pair associated with the authenticating entity 200, and the authentication module 128 can receive the public key from the authenticating entity 200 for purposes of second authentication. Once the association/pairing between the authenticating entity 200 and the compute device 100 is established in this manner (i.e., once the authentication module 128 receives the public key), in some embodiments, the authenticating entity 200 can use the private key for carrying out strong cryptographic authentication when providing the second authentication information to the compute device 100. In other embodiments, the public/private key pair can be generated by the authentication module 128 or another compute device. In some embodiments, the second authentication information/identifier includes a cryptographic signature, and the authentication module 128 is configured to use the public key to verify the cryptographic signature. Generally, in some embodiments, the communication between the authentication module 128 and the authenticating entity 200 can employ a cryptographic approach such as, for example, encryption of information for transmission, and decryption of the encrypted information upon receipt. In some embodiments, successful decryption by the authentication module 128, such as via use of the public key, can itself serve as verification of the second authentication information.

In some embodiments, additional information can be exchanged between the compute device 100 and the authenticating entity 200 over the connection 210. In some embodiments, the connection 210 serves additional purposes, such as, for example, using one of the compute device 100 and the authenticating entity 200 to power the other. For example, in some embodiments, the authenticating entity 200 can include an unpowered NFC chip or tag, which in turn can be powered during authentication by an NFC-enabled smartphone as the compute device 100. In some embodiments, the authenticating entity 200 includes at least one of a processor and a memory.

While FIG. 2 illustrates interaction between a single compute device 100 and a single authentication entity 200, in some embodiments, multiple compute devices can be associated with a single authentication entity and/or a single compute device can be associated with multiple authentication entities. For example, multiple compute devices may source second authentication information from a single authentication entity, multiple authentication entities may provide second authentication information to a single compute device, and/or multiple compute devices may source second authentication information from multiple authentication entities, depending on the nature of the authentication being performed at each compute device. In this manner, aspects of the approach illustrated in FIG. 2 are scalable for shared settings. For example, shared tablets in an enterprise setting may require that users/employees provide an enterprise-wide password (which can be any one of the first authentication and the second authentication) as well as scan a personalized NFC card provided to the employee (which can be the other of the first authentication and the second authentication). As another example, a shared tablet across various subsidiaries of a company may require, in any order, that a user provide a subsidiary-specific pin and also present a user-specific NFC card.

Referring again to FIG. 1, the authentication module 128 is further configured to determine whether correct second authentication information is received for second authentication. In some embodiments, the compute device 100 stores a unique identifier for purposes of second authentication, and the second authentication information is deemed to be correct if it exactly matches the unique identifier and/or if it matches the unique identifier to an acceptable extent such as, for example, a percentage match. In some embodiments, part of the correct second authentication information resides on the compute device 100, and another part of the correct second authentication information is required to be provided by the user (e.g., via the authenticating entity of FIG. 2), such that the combination yields the correct second authentication information.

In some embodiments, the authentication module 128 is further configured, when the second authentication identifier meets a second predetermined criterion, to enable use of the compute device 100 by a user. For example, once the correct authentication information is received for second authentication, the authentication module 128 can enable usage of the compute device 100 by a user. In some embodiments, the authentication module 128 specifies to the OS 116 to remove the usage constraints for the compute device 100 that were previously specified by the authentication module 128. In this manner, the compute device 100 acquires enhanced protection based on the usage of both the OS-initiated first authentication and the non-OS second authentication. In some embodiments, the nature of the first authentication and the second authentication can be substantially similar (e.g., both require PIN entry); in such embodiments, the first authentication information and the second authentication information can be the same or different. In other embodiments, the nature of the first authentication and the second authentication can be different and independent of each other; for example, the first authentication can include PIN entry, while the second authentication can include NFC card-based identification.

While described here using a two-factor authentication approach for simplicity, the systems and methods disclosed herein are extendible to three-factor, four-factor or more, and generally multi-factor, authentication. Further, the order of authentication for multi-factor authentication can take any suitable form; for example, if a notification of user interaction is available prior to first (OS-initiated) authentication as described here, the second authentication can be performed prior to the first authentication.

While described herein as multi-factor authentication, in other embodiments, single factor-authentication can be used. For example, an authentication module (e.g., authentication module 128 of FIG. 1) can perform a single-factor authentication in the absence of OS-initiated authentication. For example, the authentication module can perform a single-factor authentication based on an NFC card in proximity of the compute device. Moreover, in some embodiments, multi-factor authentication without OS-based and/or initiated authentication can be used. In such embodiments, the authentication module (e.g., authentication module 128 of FIG. 1) can request two or more factors prior to enabling use of one ore more functions of the compute device.

In still other embodiments, different types of authentication modes and/or different numbers of authentication modes can be requested to unlock and/or use different functions of a compute device. For example, an authentication module (e.g., authentication module 128 of FIG. 1) can request a first set of authentication identifiers (associated with a first set of authentication modes) to allow use of a first functionality and can request a second set of authentication identifiers (associated with a second set of authentication modes) to allow use of a second functionality. In some instances, the first set of authentication identifiers can be a subset of the second set of authentication identifiers, the first set of authentication identifiers can be unique and/or distinct from the second set of authentication identifiers, at least one authentication identifier from the first set of authentication identifiers can also be included in the second set of authentication identifiers (e.g., such that the authentication module need not ask for the common authentication identifier when requesting the second set of authentication identifiers based on already receiving this authentication identifier when requesting the first set of authentication identifiers), and/or the like.

In some embodiments, a second authentication step can be required before a user can access a mobile device already having an OS-initiated first authentication step, thereby providing two factor authentication. In some embodiments, a mobile application on a mobile device can include a service application and an activity application (not shown in FIG. 1). In some embodiments, the activity application and/or the service application can be integrated into a home and/or launcher application.

The activity application is used to configure a secondary lock screen (i.e., the second authentication) and specify appropriate authentication credentials (i.e., the second authentication information). As an example, the activity application can be used to configure the opacity of the secondary lock screen, textual and/or visual content of the secondary lock screen, whether the secondary lock screen will consume events such as touch, softkey events, home screen events (i.e., events that during use of the compute device direct to the first screen of information displayed when the compute device is powered up and/or that are displayed when a home button is pressed), whether the secondary lock screen will include interactive elements such as buttons, the layout of the interactive elements, and/or the like.

In some embodiments, for example, the service application is configured to start and/or be activated when the OS of the mobile device finishes booting, e.g., by registering for a BOOT_COMPLETED broadcast intent in Android™. Additionally, in some embodiments, for example, the service application can receive a notification whenever a user provides correct first authentication information and is able to use the mobile device, e.g., by registering for the USER_PRESENT intent in Android™, which is broadcast whenever a user unlocks the mobile device via the built in lock screen mechanism (i.e., the first authentication). In such embodiments, when the service application receives such a notification (e.g., the USER_PRESENT intent), the service application can present an interface for the user requesting second authentication. For example, the service application can present an opaque view with any desired text on the screen of the mobile device such as product branding, instructions to unlock, etc. In some embodiments, the service application can request second authentication via OS controls, such as, for example by establishing a connection to a screen control service (such as WindowManagerService for Android™) of the OS of the mobile device and adding the opaque view with appropriate flags to ensure that the opaque view is full screen, always on top (i.e., not overlapping and/or overlaid by other interfaces and/or applications of the mobile device), and consumes events including, but not limited to, touch and/or softkey events, home screen events, and/or the like. In some embodiments, the opaque view may consume these events, for example, by a button and/or icon behind the opaque view and not visible to the user. In other embodiments (not shown), the button and/or icon is visible to the user and forms part of the opaque view.

At this point, the service application waits to receive proper, second authentication. Referring to the example above, because the opaque view has been added to screen control service, the user is unable to view content on the mobile device or interact with the applications installed on the device. Proper secondary authentication could be any additional information supplied to the device. This can include (but is not limited to): a second password, pin, or pattern; proper authentication via an NFC token; proper recognition of a token such as a QR code via a camera; biometric information from the user such as a fingerprint or facial recognition; environmental information such as a GPS location; and/or the presence of specific wireless networks such as 802.11 access points (AP)s or Bluetooth devices, etc. After the service application has received the correct secondary authentication, the service application can allow the user to interact with the mobile device such as by, for example, connecting to the screen control service and removing the opaque view.

In some embodiments, the service application can register for notifications indicating that first authentication is pending, such as, for example, SCREEN_LOCKED events in Android™. In such embodiments, the service application can initiate second authentication such that a user must provide correct second authentication information prior to providing correct first authentication information. For example, the service application can add the opaque view discussed earlier with flags to ensure that the opaque view is displayed on top of the built-in lock screen (i.e., the first authentication), forcing the user to authenticate to the service application first, and then authenticating to the built in lock screen (i.e., perform second authentication prior to first authentication).

In some embodiments, the authentication module 128 can be configured to enable at least one function of the compute device 100 at a first time (e.g., after second authentication is successfully performed), and is further configured to disable the function at a subsequent, second time. The second time can be, for example, a predetermined time period after the first time, such as every few hours. The authentication module 128 can be further configured to request the second authentication identifier at the second time, upon disabling the function. In some embodiments, the second authentication identifier is received from a Near Field Communication (NFC) device associated with the compute device 100 via an NFC communication channel.

The authentication module 128 can be further configured to enable the function at a third time subsequent to/after the second time, such as upon verification of the second authentication identifier, and then disable the function again at a fourth time. The authentication module 128 can be further configured to request the second authentication identifier again upon disabling the function for the fourth time. In this manner, in some embodiments, the second authentication can be performed periodically, i.e., the user might have to perform secondary authentication once per day, once per hour, and/or the like. In some embodiments, the second authentication is carried out periodically and independently from the first authentication (e.g., a lock screen). For example, regardless of whether the compute device is pending first authentication or not (e.g., is locked or not), the user must reauthenticate using the second authentication every hour.

In some embodiments, the OS 116 can maintain the user as authenticated, based on the first authentication, during the predetermined period and at the second time. In some embodiments, a timeout time period is associated with the first authentication, after which the OS 116 can reauthenticate the user by requesting the first authentication information/identifier again. In some embodiments, the timeout time period associated with the first authentication is independent of and/or different from the timeout time period (similar to the predetermined time period discussed above) associated with the second authentication. In some embodiments, the first authentication and/or the second authentication timeout periods can be based on time since last authentication, time since last user interaction with the compute device (and/or a specific functionality of the compute device), geographic location of the compute device (e.g., a timeout period can be greater when the compute device is at a first geographic location than when the compute device is at a second geographic location), and/or the like.

Describing the activity application mentioned above, in some embodiments, the activity application is responsible for configuring the second authentication. The activity application provides menus, commands, and/or the like for specifying the second authentication mechanism and for pairing the compute device with the specific authentication data. The activity application and the service application can also include an "Administrator" authentication token/mechanism that can also unlock the compute device in the event a user loses credentials (e.g., loses an NFC card required for second authentication). Referring again to FIG. 2, in some embodiments, configuring the second authentication can include the step(s) of pairing the compute device 100 with the authenticating entity 200 using a public/private key pair. In some embodiments, the public/private key pair is generated on a second compute device (not shown). In this manner, when performing second authentication, the compute device 100 can retrieve and/or receive the public key from the authenticating entity 200. In other embodiments, the public/private key pair can be generated on the compute device 100 and/or at the authenticating entity 200. The public/private key pair can be used to encrypt and decrypt the identifier used in the second authentication when sent between the compute device 100 and the authenticating entity 200.

In some embodiments, the second authentication can control specific access to the compute device. For example, upon second authentication, the opaque view described above can be removed and an encrypted storage container can be made available to the user and to applications installed on the compute device. As another example, the second authentication can provide for functionality that controls access to a subset of the applications installed on the compute device.

Figure 3:
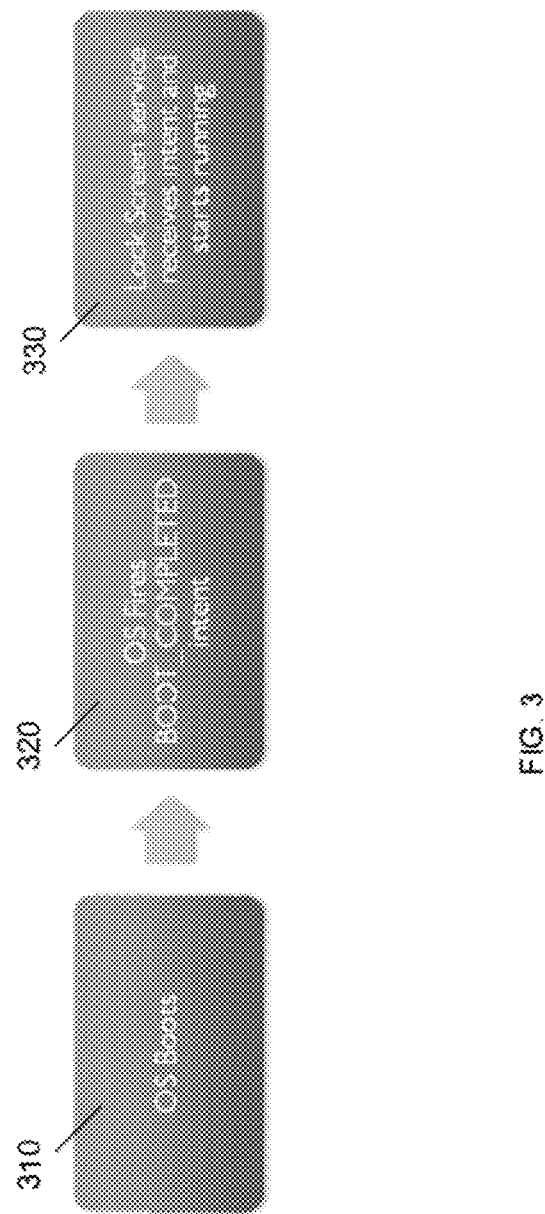
FIG. 3 is an example method for initiating multi-factor authentication upon power-up of a compute device, according to an embodiment.

FIG. 3 illustrates an example method 300 for initiating multi-factor authentication upon powering-up a compute device, according to an embodiment. At 310, the OS boots and/or is otherwise initiated when the compute device is powered up. At 320, the OS generates and broadcasts a BOOT_COMPLETED intent and/or action upon completion of the initiation process. At 330, a lock screen service (e.g., a service encompassing the notification module 124 and the authentication module 128) received the BOOT_COMPLETED intent and is initiated. The lock screen service can then take any suitable action as described herein, including requesting second authentication to be performed substantially immediately (prior to any first authentication being performed), waiting for another event indicating that first authentication has been performed (e.g., a USER_PRESENT intent in Android™) prior to requesting second authentication to be performed, and/or the like.

Figure 4:
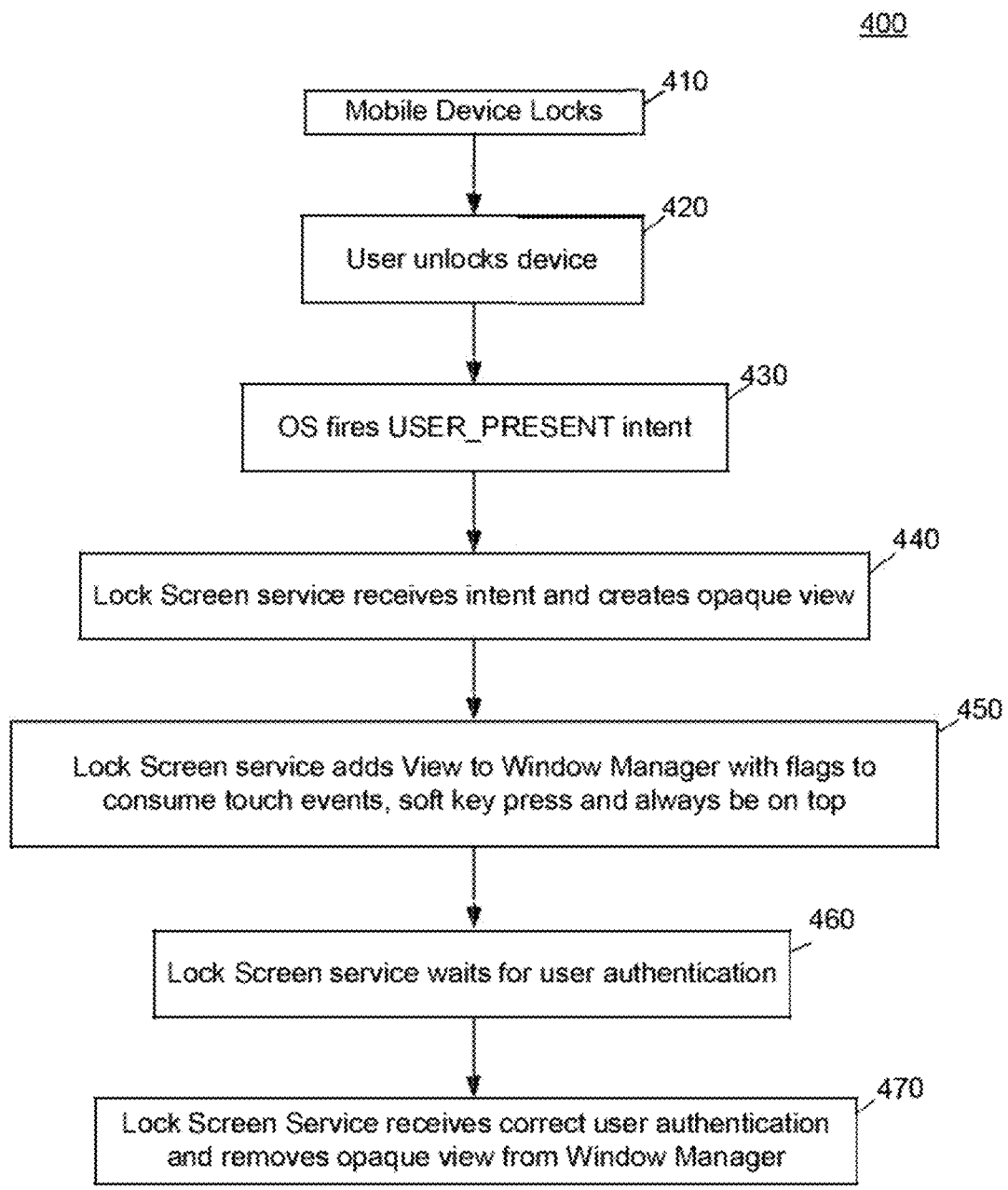
FIG. 4 is an example method for multi-factor authentication for a locked compute device, according to an embodiment.

FIG. 4 illustrates an example method 400 for initiating multi-factor authentication upon use of a compute device such as a mobile device that has already been powered-up, according to an embodiment. At 410, the mobile device locks due to, for example, the user locking the device or due to inactivity. At 420, the user unlocks the device, such as by performing first authentication steps initiated by the OS of the device. At 430, the OS broadcasts a USER_PRESENT intent to indicate that the user now has access to the device. At 440, a lock screen service, similar to that described for FIG. 3, receives the USER_PRESENT intent and presents an opaque view. At 450, the lock screen service adds the opaque view to a screen control service of the OS (the "Window Manager" here) with indications/flags to consume user interactive events such as touch and soft key presses, and to further always have the opaque view on top (i.e., not overlapping and/or overlaid by other interfaces and/or applications of the mobile device). At 460, the lock screen service waits for the second authentication, and at 470, the lock screen service removes the opaque view via the screen control service upon receiving correct second authentication information.

Figure 5:
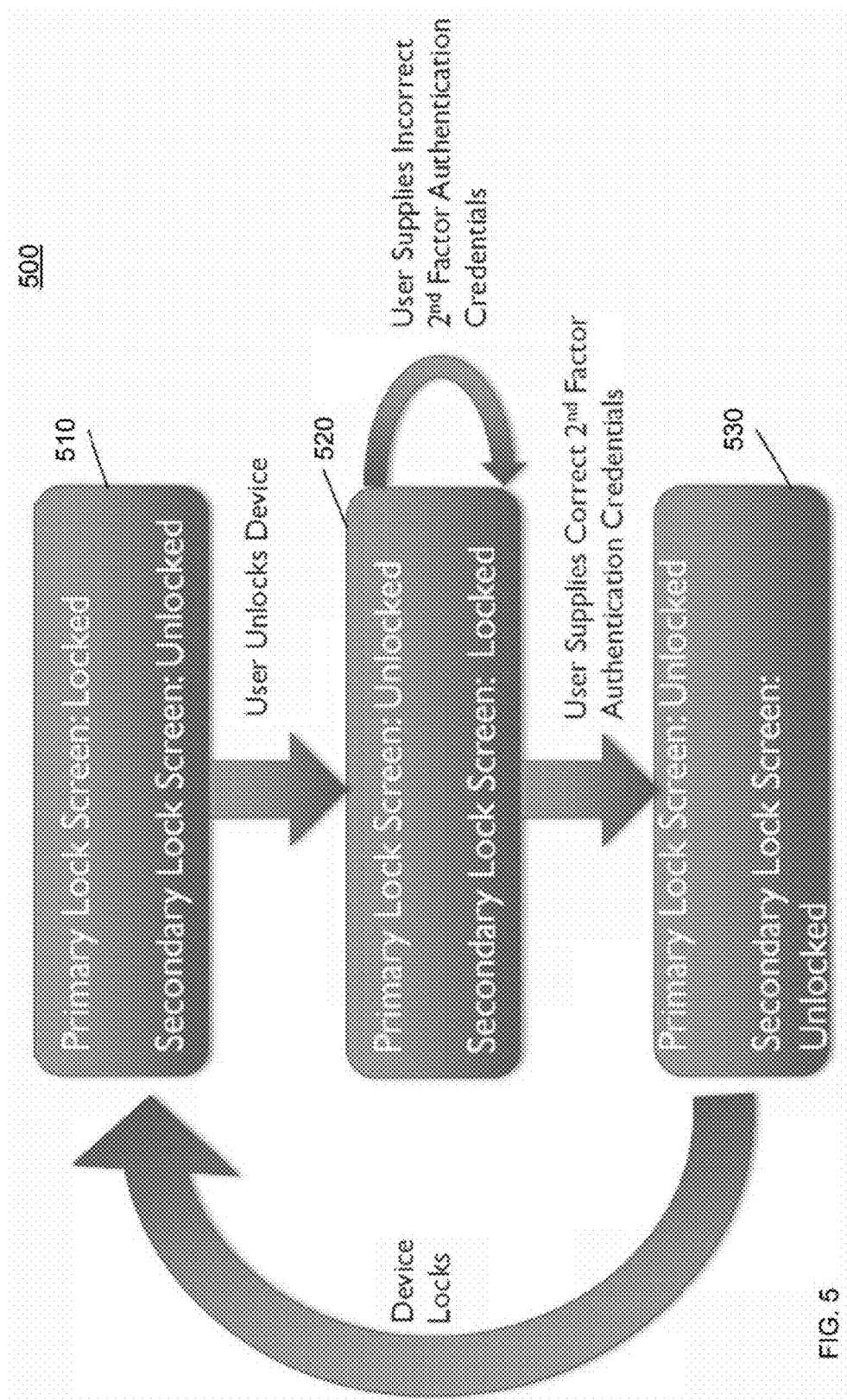
FIG. 5 is an example state diagram of a compute device with multi-factor authentication, according to an embodiment.

FIG. 5 illustrates a state diagram for a compute device having two-factor authentication where both the first authentication and the second authentication include lock screens, according to an embodiment. The state 510 is achieved when the primary lock screen is locked (i.e., the primary lock screen prevents access to the device pending first authentication). The state 520 is achieved when the user unlocks the primary lock screen (i.e., provides correct first authentication information), which results in the secondary lock screen being locked (i.e., the secondary lock screen prevents access to the device pending second authentication). The compute device stays in the state 520 as long as the secondary lock screen is locked, or as long as the user fails to provide correct second authentication information. The compute device transitions to state 530 after the user supplies correct second authentication information, at which point both the primary lock screen and the secondary lock screen are unlocked, and the compute device is usable. The compute device can transition back to state 510 whenever first authentication is required again such as, for example, when the user locks the compute device, when the device is shut down and powered up again, when the compute device is not used for a specific duration (i.e., is inactive), and/or the like. In some embodiments (not shown), other transitions between the states 510, 520 and 530 are possible, based on, for example, the periodicity with which the first authentication is required and the periodicity with which the second authentication is required.

Figure 6:
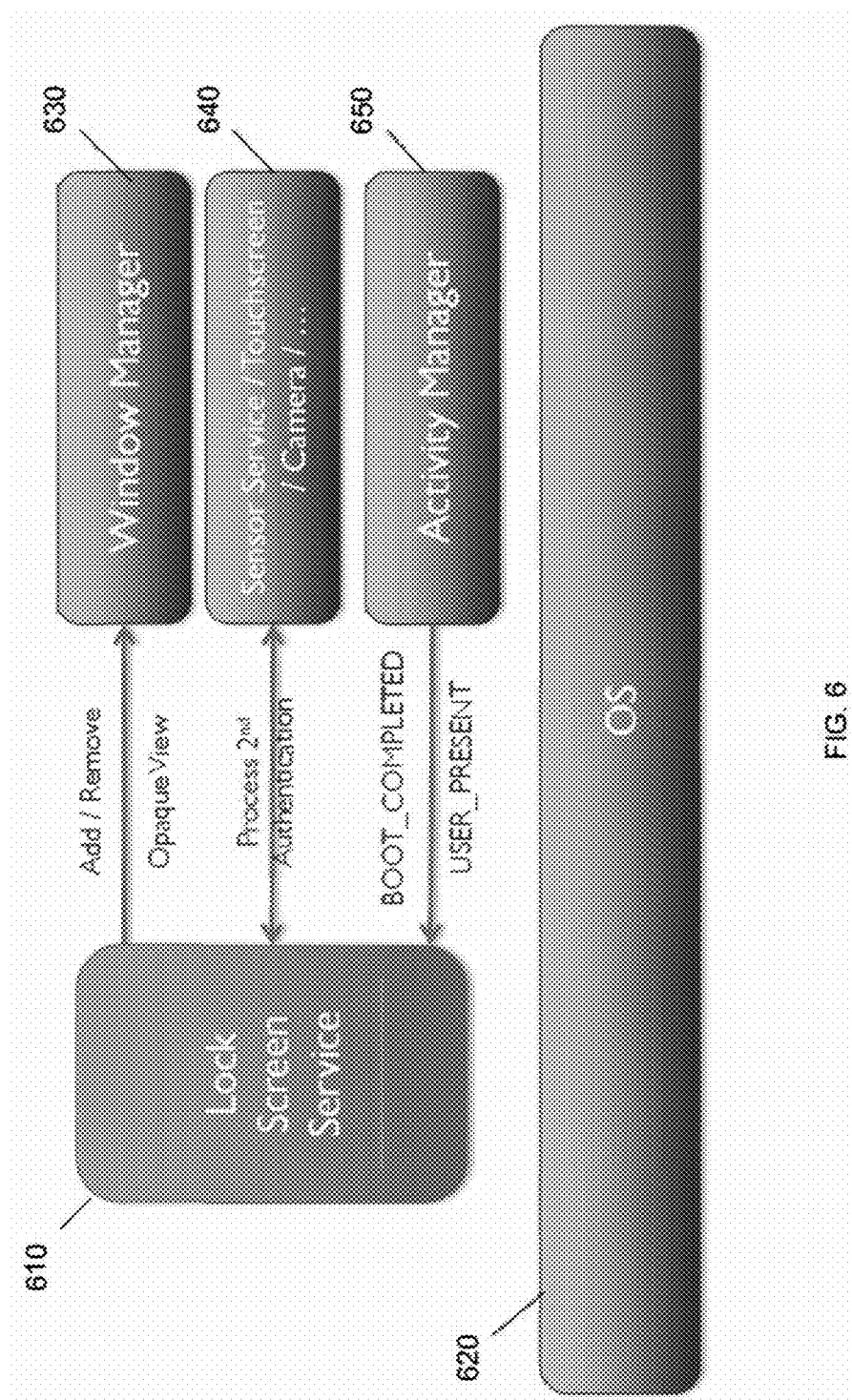
FIG. 6 is a schematic diagram of interaction between the operating system and a lock screen service for multi-factor authentication, according to an embodiment.

FIG. 6 illustrates, according to an embodiment, interaction between the lock screen service 610 (e.g., including the notification module 124 and the authentication module 128 of FIG. 1) and aspects of the OS 620. Specifically, the OS 620 manages and/or controls various services that interact with the lock screen service 610 such as a Window Manager 630 (similar to the screen control service described above), an I/O Manager 640 that interacts with aspects of the device such as sensors, touchscreen, camera, etc. (similar to a kernel of an operating system), and an Activity Manager 650 that generates consumable notifications. During operation, the lock screen service 610 receives notifications such as BOOT_COMPLETED (when the device is powered up) and/or USER_PRESENT (after the user has entered valid credentials to the first authentication screen) from the Activity Manager 650. The lock screen service 610 then adds an opaque view to the screen of the device via the Window Manager 630, and then works in concert with the I/O Manager 640 to carry out second authentication of the user. After the user provides correct second authentication information, the lock screen service 610 removes the opaque view via the Activity Manager 650.

Figure 7:
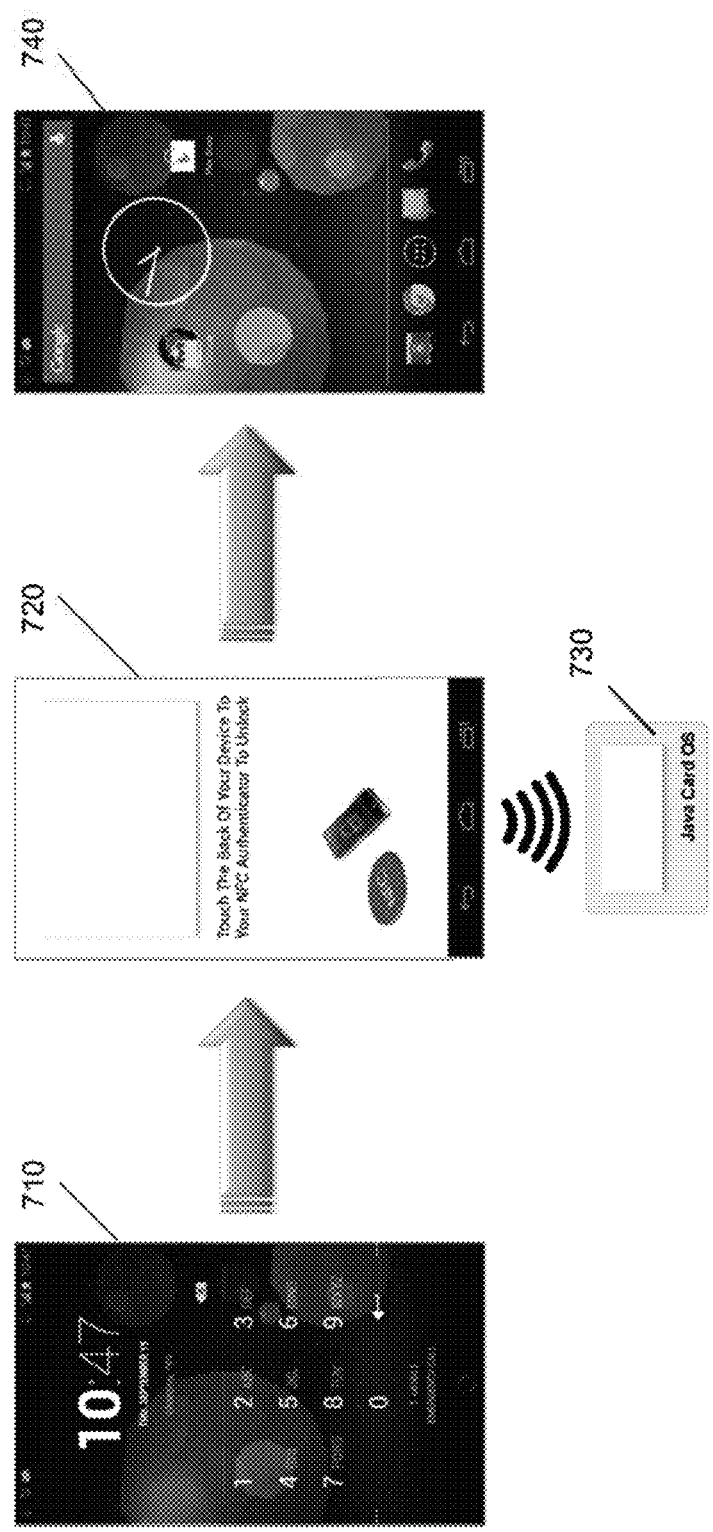
FIG. 7 is an example illustration of user interfaces of a mobile device undergoing first authentication and second authentication, according to an embodiment.

FIG. 7 illustrates an example embodiment of the use of a NFC card for performing second authentication. A mobile device interface 710 provides a keypad for performing first authentication after the mobile device boots-up, or after the user locks the mobile device. Upon successful first authentication, the mobile device interface 720 is presented to the user as an opaque view that prohibits use of the mobile device. The mobile device interface 720 further includes instructions for the user to touch the NFC card 730, illustrated here as a Java™ card for purpose of explanation, to the mobile device to unlock the mobile device. When the user does accordingly, the mobile device interface 720 is removed and replaced by the usable interface 730.

Figure 8:
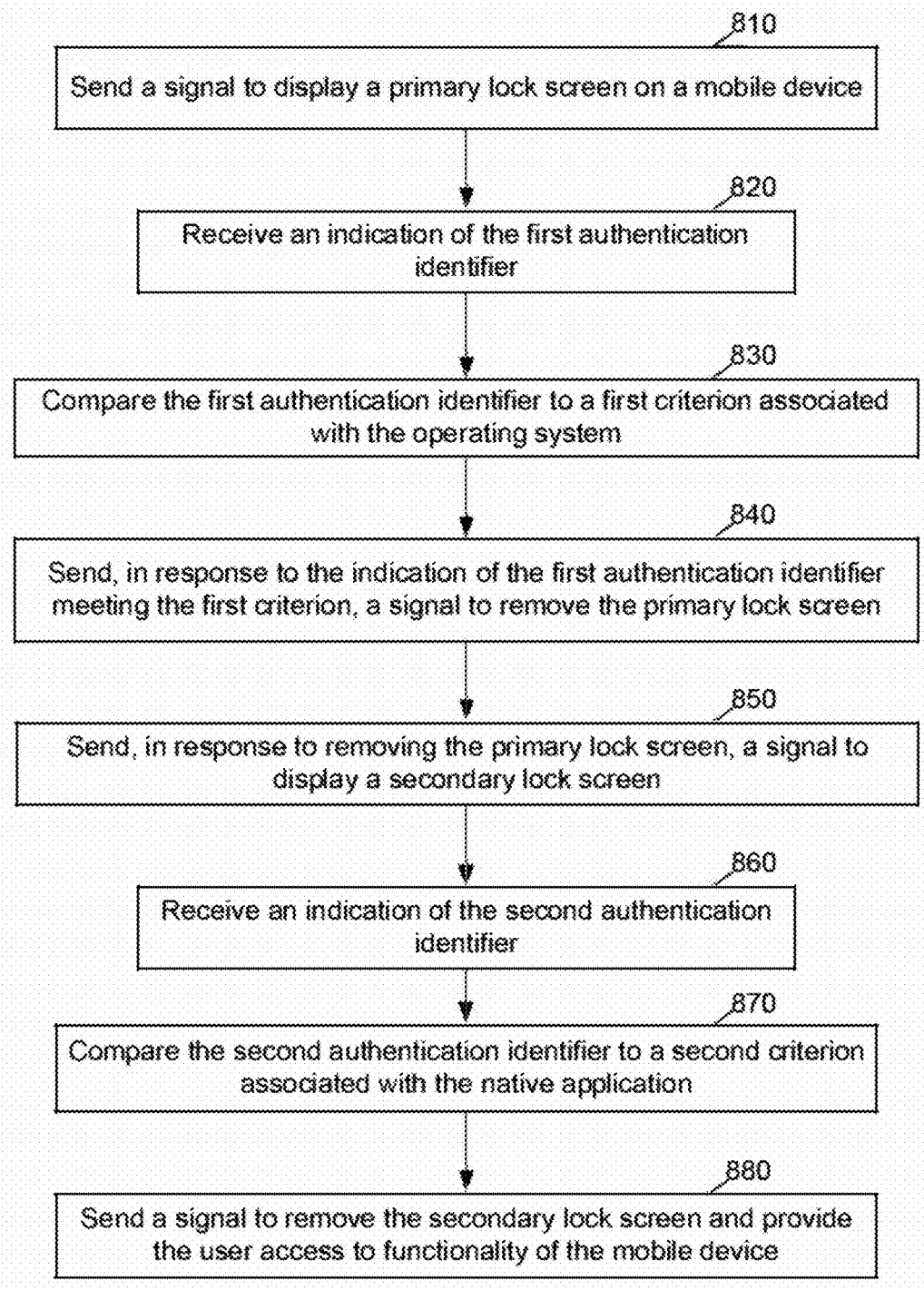
FIG. 8 illustrates an authentication method, according to an embodiment.

In some embodiments, a non-transitory processor-readable medium stores code representing instructions to be executed by a processor, such as the processor 110, to perform user authentication. As illustrated in FIG. 8, in some embodiments, the code includes code to cause the processor to perform a method including, at 810, send a signal to display a primary lock screen on a mobile device (e.g., the compute device 100). The primary lock screen is integrated with an operating system (e.g., the OS 116) of the mobile device, and requests a first authentication identifier from a user. The code also includes code to cause the processor to, at 820, receive an indication of the first authentication information/identifier. In some embodiments, the indication of the first authentication identifier is received via a first input mode.

The code also includes code to cause the processor to, at 830, compare the first authentication identifier to a first criterion associated with the operating system. The code also includes code to cause the processor to, at 840, send, in response to the indication of the first authentication identifier meeting the first criterion, a signal to remove the primary lock screen. The code also includes code to cause the processor to, at 850, send, in response to removing the primary lock screen, a signal to display a secondary lock screen. The secondary lock screen is associated with an application not integrated with the operating system of the mobile device. The secondary lock screen requests a second authentication identifier from the user. In some embodiments, a timeout time period associated with the primary lock screen is different than a timeout time period associated with the secondary lock screen.

The code also includes code to cause the processor to, at 860, receive an indication of the second authentication identifier. In some embodiments, the indication of the second authentication identifier is received from an authentication entity associated with the user. In some embodiments, the code also includes code to cause the processor to receive a public key from the authentication entity, and verify a cryptographic signature of the second authentication identifier using the public key. For example, during a setup procedure and/or upon an initial interaction between the processor and the authentication entity, the processor can receive the public key from the authentication entity. The processor can them employ the public key for verifying the cryptographic signature multiple times, such as for each subsequent time the second authentication identifier is received. In some embodiments, the indication of the second authentication identifier is received via a second input mode that is different from the first input mode.

The code also includes code to cause the processor to, at 870, compare the second authentication identifier to a second criterion associated with the native application. The code also includes code to cause the processor to, at 880, send, based on the indication of the second authentication identifier meeting the second criterion, a signal to remove the secondary lock screen and to provide the user access to functionality of the mobile device. In some embodiments, the signal to remove the secondary lock screen is sent at a first time, and the code also includes code to cause the processor to send a signal to display the secondary lock screen at a second time a predetermined time period after the first time.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, .NET, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

What is claimed is:

1. An apparatus, comprising:
   a memory of a mobile compute device; and
   a hardware processor of the mobile compute device, the hardware processor configured to implement an operating system and a native authentication application that is not part of the operating system,
   the operating system configured to receive a first authentication identifier via a first authentication mode, the operating system configured to authorize use of the mobile compute device based on the first authentication identifier meeting a first criterion,
   the operating system configured to monitor inputs associated with the mobile compute device, and detect a change in the inputs associated with the mobile compute device,
   the operating system configured to broadcast a notification based on the change in the inputs associated with the mobile compute device,
   the native authentication application configured to receive the notification, and based on receiving the notification, disable at least one function of the mobile compute device and transmit a request for a second authentication identifier,
   the native authentication application configured to receive the second authentication identifier via a second authentication mode different from the first authentication mode, the native authentication application configured to enable the at least one function in response to the second authentication identifier meeting a second criterion.

2. The apparatus of claim 1, wherein the change in inputs is associated with an activity of a user after a period of inactivity of the user.

3. The apparatus of claim 1, wherein the change in inputs includes a change in a type of interaction of a user with at least one of a hardware component or a software component associated with the mobile compute device.

4. The apparatus of claim 1, wherein the change in inputs is associated with an activity of a user after a time period of inactivity of the user, the operating system being configured to:
   receive an indication of a geographic location associated with the mobile compute device; and
   define the time period of inactivity based on the indication of the geographic location.

5. The apparatus of claim 1, wherein the first authentication mode is implemented via a first input/output (I/O) interface from a plurality of I/O interfaces and the second authentication mode is implemented via a second I/O interface different from the first I/O interface and from the plurality of I/O interfaces.

6. The apparatus of claim 1, wherein the first authentication mode is implemented by the operating system and the second authentication mode is based on the native application.

7. The apparatus of claim 1, wherein the first authentication mode is implemented via a biometric input interface and the second authentication mode is implemented via a touch-screen interface.

8. A method, comprising:
   monitoring an activity associated with a user of a mobile compute device;
   detecting a change in inputs associated with the mobile compute device, and based on the change in inputs, disabling, via a native authentication application, at least one function of the mobile compute device;
   receiving, via the native authentication application, at a first time and in response to the disabling, a first authentication identifier;
   receiving, via an operating system, at a second time after the first time, and based on the first authentication identifier meeting a first criterion, a second authentication identifier;
   authorizing, via the operating system, use of the mobile compute device based on the second authentication identifier meeting a second criterion;
   receiving, via the native authentication application, an indication from the operating system that the operating system has authorized use of the mobile compute device; and
   enabling, via the native authentication, the at least one function in response to the receiving the indication.

9. The method of claim 8, wherein the change in inputs is associated with an activity of the user after a period of inactivity of the user.

10. The method of claim 8, wherein the change in inputs is associated with an inactivity of the user after a period of activity of the user.

11. The method of claim 8, wherein the change in inputs includes a change in a type of interaction of the user with at least one of a hardware component or a software component associated with the mobile compute device.

12. The method of claim 8, wherein the change in inputs is associated with an activity of the user after a time period of inactivity of the user, the method further comprising:
receiving an indication of a geographic location associated with the mobile compute device; and
defining the time period of inactivity based on the indication of the geographic location.

13. The method of claim 8, wherein the enabling the at least one function is at a first time, the method further comprising:
disabling, via the native authentication application, the at least one function at a second time that is a predetermined time period after the first time;
maintaining, via the operating system, the user authenticated to the mobile compute device at the second time; and
requesting the first authentication identifier in response to disabling the at least one function at the second time.

14. The method of claim 8, wherein the native authentication application is not part of the operating system on the compute device and is executed by the operating system of the compute device.

15. The method of claim 8, wherein the second authentication identifier is associated with an operating system-based authentication mode and the first authentication identifier is associated with a non-operating system-based authentication mode.

16. The method of claim 8, further comprising:
monitoring, via the native authentication application, for the indication to be broadcast by the operating system that the operating system has authorized use of the mobile compute device.

17. The method of claim 8, further comprising requesting, from a Near Field Communication (NFC) device associated with the mobile device and in response to the disabling, the first authentication identifier,
the receiving the first authentication identifier is from the NFC device via an NFC communication channel and in response to the requesting.

18. The method of claim 8, wherein the first authentication identifier is received via a first authentication mode that is implemented via a first input/output (I/O) interface from a plurality of I/O interfaces and the second authentication identifier is received via a second authentication mode that is implemented via a second input/output (I/O) interface different from the first I/O interface and from the plurality of I/O interfaces.

19. An apparatus, comprising:
a memory of a compute device; and
a hardware processor of the compute device, the hardware processor configured to implement an operating system and a native authentication application, the hardware processor configured to:
disable, via a native authentication application, at least one function of the compute device;
receive information associated with a change in inputs associated with the compute device;
transmit, via the native authentication application, a request for an authentication identifier;
receive, via the native authentication application and in response to the transmitting, the authentication identifier;
receive, via the native authentication application and in response to the information associated with the change in inputs, an indication broadcast by the operating system that the operating system has authorized use of the compute device; and
enable, via the native authentication application, and based on the indication and the authentication identifier, the at least one function.

20. The apparatus of claim 19, wherein the authentication identifier is a first authentication identifier, and the hardware processor is configured to receive the first authentication identifier at a first time, the hardware processor being further configured to:
receive, via the operating system, at a second time after the first time, and based on the first authentication identifier meeting a first criterion, a second authentication identifier;
authorize, via the operating system, use of the compute device based on the second authentication identifier meeting a second criterion; and
transmit, based on authorizing use of the compute device, the indication from the operating system that the operating system has authorized use of the compute device.

21. The apparatus of claim 20, wherein the first authentication identifier is received via a first authentication mode that is associated with the native authentication application and the second authentication identifier is received via a second authentication mode that is associated with the operating system.

22. The apparatus of claim 19, wherein the authentication identifier is a biometric authentication identifier, the hardware processor being further configured to receive the biometric authentication identifier via a biometric interface associated with the compute device, the biometric authentication identifier including an indication of biometric information related to a user of the compute device.

23. The apparatus of claim 19, wherein the change in inputs is associated with an activity of a user after a period of inactivity of the user, and the transmitting the request for the authentication identifier is based on the change in inputs associated with the activity of the user.

24. The apparatus of claim 19, wherein the change in inputs is associated with an inactivity of a user after a period of activity of the user, and the disabling the at least one function is based on the change in inputs associated with the inactivity of the user.

25. The apparatus of claim 19, wherein the change in inputs includes a change in a type of interaction of a user with at least one of a hardware component or a software component associated with the compute device.

* * * * *